United States Patent
Daynes et al.

(10) Patent No.: US 6,715,144 B2
(45) Date of Patent: Mar. 30, 2004

(54) REQUEST BASED AUTOMATION OF SOFTWARE INSTALLATION, CUSTOMIZATION AND ACTIVATION

(75) Inventors: Gregory Daynes, Fishkill, NY (US); Norbert Lenz, Magstadt (DE); Adrainus Schuur, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 09/752,053

(22) Filed: Dec. 29, 2000

(65) Prior Publication Data

US 2002/0013939 A1 Jan. 31, 2002

(30) Foreign Application Priority Data

Dec. 30, 1999 (EP) .............................. 99126198

(51) Int. Cl.[7] .............................. G06F 9/445; G06F 9/44
(52) U.S. Cl. ....................... 717/174; 717/168
(58) Field of Search ................. 717/174–178, 717/168–173, 122, 100

(56) References Cited

U.S. PATENT DOCUMENTS

| | | | | |
|---|---|---|---|---|
| 6,125,402 A | * | 9/2000 | Nagarajayya et al. | 709/330 |
| 6,381,742 B2 | * | 4/2002 | Forbes et al. | 717/176 |
| 6,405,364 B1 | * | 6/2002 | Bowman-Amuah | 717/101 |
| 6,442,754 B1 | * | 8/2002 | Curtis | 717/175 |
| 6,513,153 B1 | * | 1/2003 | Lee | 717/100 |
| 6,529,784 B1 | * | 3/2003 | Cantos et al. | 700/79 |

OTHER PUBLICATIONS

Gotze. EASE– a Softare Integration Tool and User Interface. IEEE. 1994. pp. 352–356.*
Fischer et al. Service Composition in a TINA Environment. IEEE. 1998. pp. 180–182.*

* cited by examiner

*Primary Examiner*—Wei Zhen
(74) *Attorney, Agent, or Firm*—William A. Kinnaman, Jr. Esq.; Heslin Rothenberg Farley & Mesiti P.C.

(57) ABSTRACT

The invention relates to a system and method for request based installation, customization and activation of software products on a computer system by means of a setup infrastructure (20) for coordinating the process phases. A plurality of exploiter plug-ins (24) are provided, each assigned to a program product already installed in the computer system or a program product to be installed. The exploiter plug-ins are used by the setup infrastructure for indicating a program package description and program product description and for providing customization dialogs and support to instantiate and activate the program to be installed. Bind supporter plug-ins (23) are assigned to selected ones of the program products and used for supporting the binding procedure by providing bind services to the setup infrastructure. The supporter plug-ins are used by the exploiter plug-ins to establish binding to at least some of the program packages or products stored, where the binding parameters needed by the exploiter plug-ins are indicated to the supporter plug-ins by bind requests. Package adapter plug-ins are provided to provide data format information for enabling the setup infrastructure to identify a program product to be installed and to generate product definition data. A management directory (27) is used for storing data associated with a particular program product and references to program products in a program library of the computer system.

18 Claims, 5 Drawing Sheets

REQUEST BASED AUTOMATION OF SOFTWARE INSTALLATION, CUSTOMIZATION AND ACTIVATION

PRIOR FOREIGN APPLICATION

This application claims priority from European patent application number 99126198.3, filed Dec. 30, 1999, which is hereby incorporated herein by reference in its entirety.

1. Technical Field

The invention relates to a system and a method for request based installation, customization and activation of software packages or products on a large computer system operated by a system control program.

2. Background Art

Large multi-user computer systems such as, for example, IBM OS/390, are sensitive about introduction of new software programs or services. These computer systems are used for many different applications. The same software programs/packages may need to be set up differently depending on what other software is installed and what applications they will be used for.

A straight forward and highly productive approach as used on workstations, where endusers usually install software packages themselves using an automated install process, is not feasible in large multi-user environments. This is mainly because typically thousands of endusers share such systems. Any failure during the installation process can jeopardize the availability or performance of the system, thereby impacting other users, or adversely impacting the protection of sensitive information belonging to the enterprise. Usually, dedicated technical staff is responsible for coordinating the use, administration and maintenance of such systems. Examples are installing and servicing of new software packages, authorizing access to sensitive or proprietary data, providing services and access from networks, organizing placement of databases, etc. Furthermore, many enterprises have multiple compute center sites. Often, the software setup process has to be repeated on each of those sites, because of slight variations in the computing environments.

Simpler software setup procedures are wanted in such complex environments. Such procedures should also enable and ensure enterprise specific responsibilities and policies.

Tools and processes available for workstations are not usable for this purpose. On workstations the process provides a simple dialog to give the enduser the ability to customize the software package or product and then executes a script to install and register the product. A typical example is the program 'InstallShield Professional 2000 International', distributed by InstallShield (R) Software Corporation, Chicago, Ill., USA. This program consists of a set of tools to be used by software package owners to condition the program packages and to facilitate the installation process by generating the dialogs and the installation script. Scripts are series of commands or a program usually written in the batch execution command language of the particular operating system to perform the actual installation and registration. This known program does not comprise provisions for IT staff to control and coordinate these actions. Such provisions are not supposed to be needed on workstations which are normally dedicated to one user.

SUMMARY OF THE INVENTION

It is an object of the invention to provide an improved software setup procedure for large computer systems.

It is also an object of the invention to provide a system and a method for a request based installation, customization and activation of software packages or products on a large computer system.

It is a further object of the invention to provide a system and a method which enables and ensures enterprise specific responsibilities and policies in connection with a request based installation, customization and activation of software packages or products on a large computer system.

The system according to the invention, as defined in the claims, comprises a setup infrastructure for coordinating the loading, customization, binding and activation of the program package or product to be installed. A plurality of exploiter plug-ins, each connected to one of said system resources, are used by the setup infrastructure means for creating a product definition, for providing customization dialogs and for supporting the initialization and modification of the program package or product to be installed. A plurality of supporter plug-ins are provided, each connected to selected ones of said system resources for supporting the binding procedure by providing bind services to the setup infrastructure. The supporter plug-ins are used by the exploiter plug-ins to establish binding to at least some of the program packages or products already installed, where the binding parameters needed by the exploiter plug-ins are indicated to the supporter plug-ins by Bind-Requests.

According to another aspect of the invention package adapter plug-ins are provided which identify various data formats, one of said third type plug-ins is assigned to a program product to be installed for indicating to the setup infrastructure the specific package formats as used by said program.

According to another aspect of the invention a management directory is connected to the setup infrastructure for storing all data associated with a particular software package or product and references to portions of said software package or product in a system library. These references are used by the setup infrastructure for accessing said data in a system library wherein said software package or product is stored.

Furthermore, according to the invention a method is provided, as defined in the claims, for request based installation, customization and activation of software packages or products on a large computer system.

Due to the declarative nature of bind requests and the capability to have a set of SI-supporters, the setup task will be much more complete. Support will not only exist to set system parameters, but there will also be supporters for areas like security, TCP/IP, etc. Therefore a program product can be taken into use after the request based software setup is complete without additional manual interaction.

Since properties are stored in the management directory, the plug-ins of the first type can provide intelligent customization dialogs. These dialogs can work with various sources of parameter values: defaults provided by the plug-ins of the first type, customization data from previous releases, primed data from the target system and customization data of other products. This can be used to achieve increased ease of use by offering a guided mode relying on defaults, further an intelligent migration support from an older to a newer program product release, an intelligent checking of prerequisites and corequisites, and an intelligent and ease of use customization by understanding the context in which a product will be used.

Since properties and bind requests can be exported and imported, and since bind requests contain references instead of copied values, installations can be replicated with minimal human interaction on the receiving side. This capability of replicating reference installation saves redundant effort for setup.

Due to the possibility of policy-based procedures, the customer's organization of authority for critical areas (security administration, database administration, network administration, etc.) are respected. If the customer changes his organization, the request based software setup can easily be adapted.

Since bind requests model a state of the system and since the plug-ins of the second type are strictly separated from the role of the first type plug-ins, the unbind of requests can be handled in a clean way: During reconfiguration, if old requests are replaced by other new requests, the plug-ins of the second type can verify that no other exploiter depends on the old request and eliminate its effects in the system resources so that no garbage will be left over. The same is true when removing a product from a system. The supporter can verify that no other exploiter depends on requests of the product to be removed, and then eliminate its effects in the system resources. Also in this case no garbage will be left over.

Due to its dynamic plug-in capabilities, the solution according to the invention is applicable as well to heterogeneous environments including computer systems of different manufacturers.

BRIEF DESCRIPTION OF THE DRAWINGS

In the following the invention is described with reference to drawings and to an application example. The drawings show.

BEST MODE FOR CARRYING OUT THE INVENTION

Figure 1:
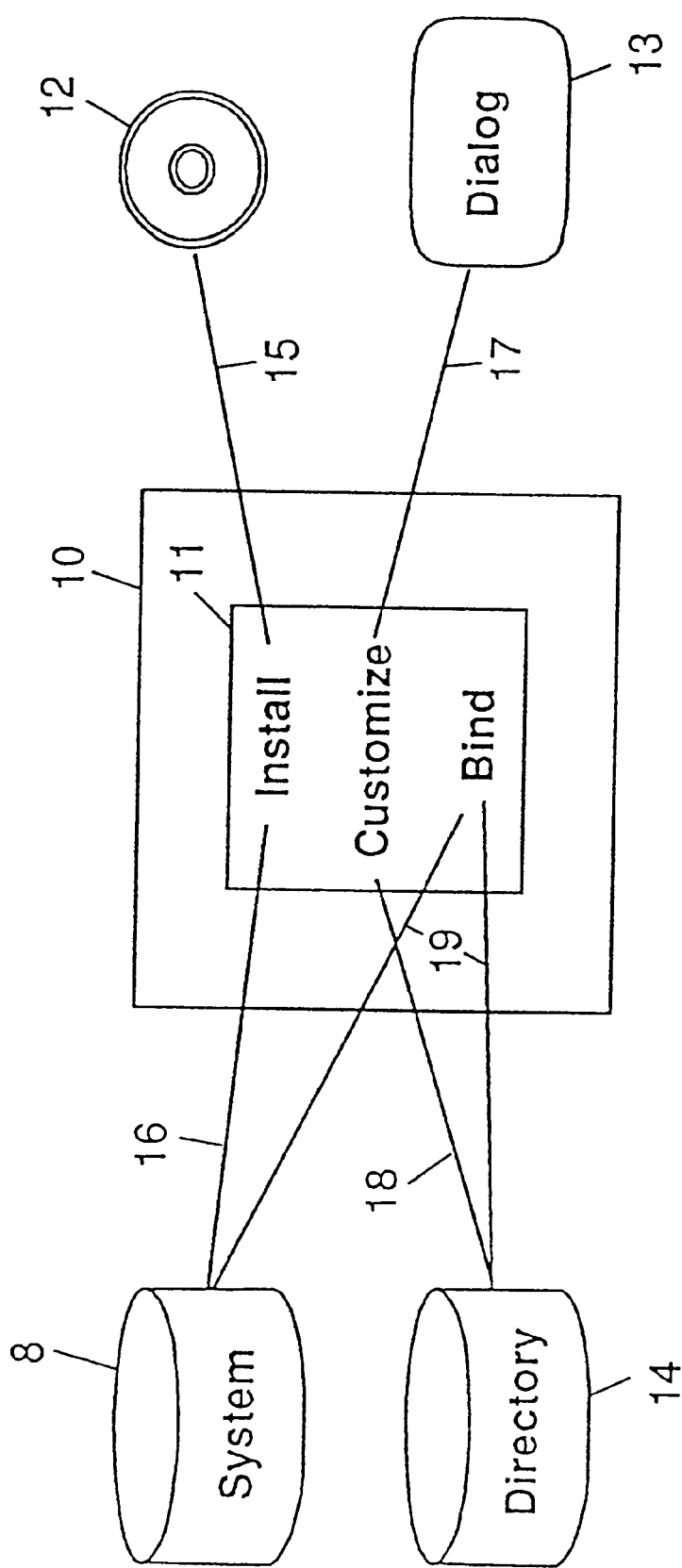
FIG. 1 a flow diagram of a typical install process as executed on workstations.

FIG. 1 relates to the prior art and shows how a typical program product install process is executed with a known workstation 8 being operated by a system control program 10 which includes a program installation, customization and bind component 11 and using a program source 12, a dialog support 13 and a directory 14. As indicated by connections 15 and 16 a program product is loaded from program source 12 into the workstation 8. The dialog support 13 provides via connection 17 program customizing information which is stored in a directory 14 through connection 18. By means of address information contained in the directory and by using the customizing information the program product is bound to the system control program of the workstation as indicated by the connections 19.

It can be seen that the known install process is executed as one entity. The install process knows what has to be done and how this should be done. The install process actually changes the system according to implied rules, and is acting like a black box.

The request based processing according to the invention uses a different paradigm. It separates the 'what is needed' from 'how' and 'when'. The customization process indicates via Bind Requests what is needed to get successfully installed. The activities involved in the process are coordinated by an infrastructure component which is part of the operating system and called herein setup infrastructure or abbreviated SI.

Definition of Terms

In this disclosure 'setup' is defined as the process to automate the installation, customization and activation of software packages or individual program products.

A 'program package' and 'program product' when used separately are herein synonyms, when used jointly these terms relate to a package containing multiple programs products as well as a single program product. Program products may be operating system components, utility programs or application programs.

'System resources' designates hardware and software components of the computer system comprising program packages and individual program products already installed on the computer system and in use.

An 'image' is a software entity which can be subject of an initial program load (IPL) operation and which usually comprises a plurality of program products.

'IP': Internet Protocol.

'LDAP': Lightweight Directory Access Protocol. A programming protocol adopted by the IETF (Internet Engineering Task Force) to access directories.

'X.500' defines the organization and working of directories according to the ISO OSI Directory Standard (CCITT Recommendation X.500). It is recommended by the International Telegraph and Telephone Consultative Committee.

'CIM': Common Information Model. A data model describing the parts a computer system consists of. CIM was defined by the Distributed Management Task Force (DMTF).

'DMTF': Distributed Management Task Force, a non-profit organization defining computer management related standards.

'DB2': A relational data base product of the IBM Corporation.

'SMPE': System Modification Program Extended. A system management program that is part of IBM's OS/390 Operating System.

'File packs': Collection of files to be installed. A term used mainly on Unix type systems.

'Tar': Tape archiver. A program used in Unix type systems for loading and unloading files.

'Jar': Java archive. A file format used by the Java language to bundle individual files.

The Principles of Operation

The setup process according to the invention can be divided into four phases:

1. The physical install process for loading down a program product without modifications from a source which may be a local or remote program library;
2. the dialog section for enabling customization options to be specified;
3. the bind process for applying customization options to the system resources and the program product; and
4. the activation process for making the customized product executable.

1 The Bind Process

In a clustered environment a plurality of computer systems can be grouped together forming a system cluster which is essentially a group of individual computers working together in a coordinated fashion to run a plurality of program systems. An example of a cluster system is an OS/390 Sysplex. From a setup point of view the individual program systems are called Images. As defined above, an Image is a software entity that can be subject of an initial program load (IPL) operation and that usually comprises a plurality of program products. The bind process binds a newly installed product or package to an existing Image. This means that the physical install process is done once for the whole cluster. The Bind and Activate phase will tie the new function to the individual images of the cluster. This is done either serially initiated by the system administrator one after the other, or in one operation to all Images. During the Bind process the system administrator defines which Image to bind to.

During Bind processing the libraries involved optionally will be replicated in order to minimize single points of failures. If this option is not chosen, the program libraries will be shared between Images.

The Bind concept can also be useful for single systems which are not part of a cluster. Normally enterprises have multiple Images for the purpose of test, production, backup and development. Also in this case selective Bind processing is an advantage.

A Bind Request describes a state of a system resource to be reached when the request is processed. The process handling is idempotent, meaning that when the resource already is in the requested state, the request will be ignored. Bind requests are always kept and associated with the software package that introduced them; because of the idempotency property they can be re-executed any time to facilitate partial or full recovery after a system crash without any further qualification. Bind processing can be controlled by policies that are defined to ensure that enterprise rules and regulations will be adhered to.

As part of the Bind process, the Product Instantiation program is called to enable the product to be installed to modify itself according to the customization properties.

2 The Setup Infrastructure

Figure 2:
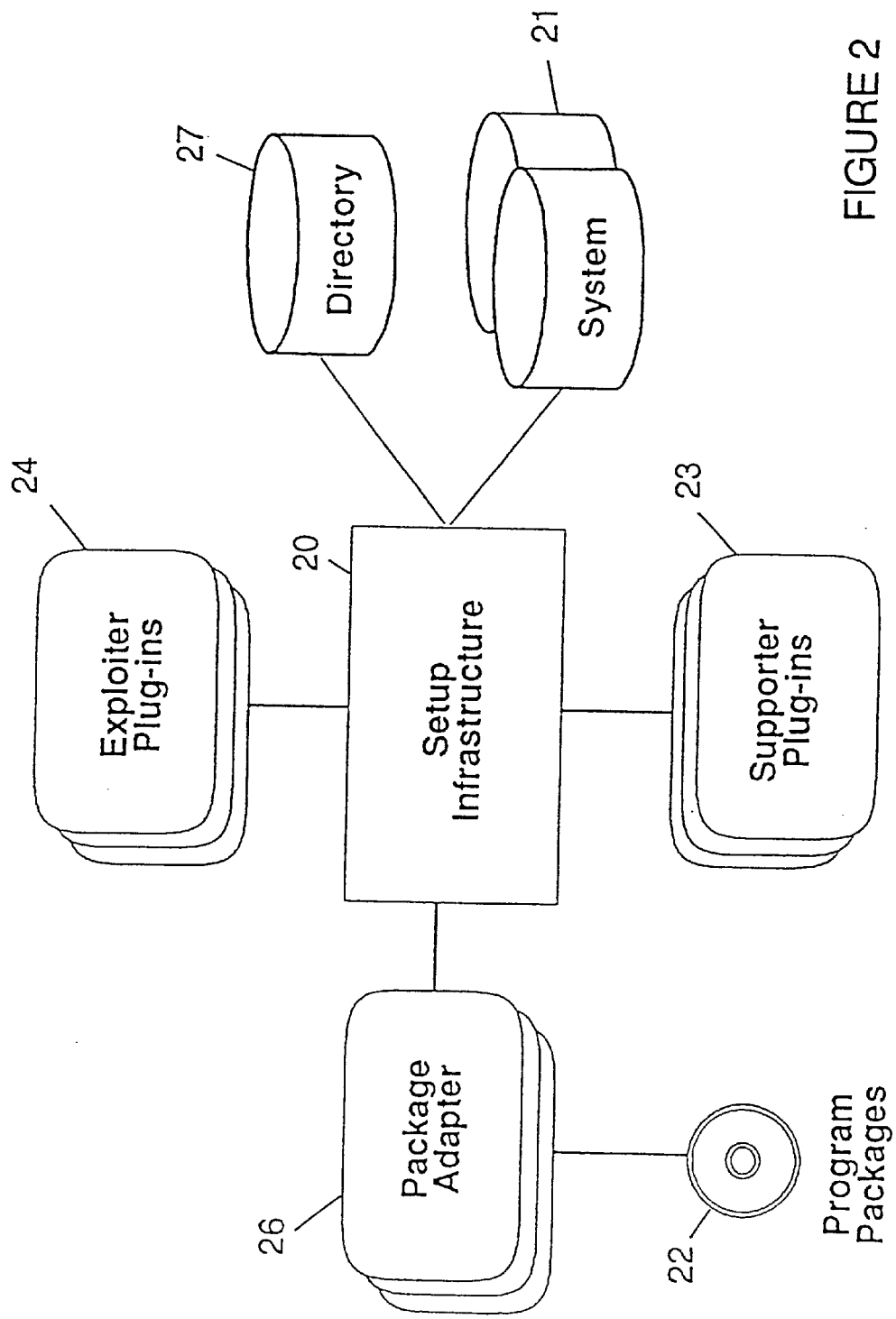
FIG. 2 a general block diagram of an implementation of the invention.

A preferred implementation of the invention as shown in the general block diagram of FIG. 2 comprises a setup infrastructure 20 which is part of an operating system used to control a large computer system 21 of which in FIG. 2 only the program library disks are represented. The large computer system 21 comprises a plurality of system resources including a plurality of processors and a plurality of program packages and individual program products installed in the system and activated to run on the system. These program packages and individual program products may be utility programs such as data base administration programs, communication controller or security packages. At least some of the program packages and individual program products have interdependencies among each other. Additional program packages or individual programs are loaded into the system 21 from a program source 22. For these additional program packages or individual programs interdependencies have to be established to at least some of the program packages and products already installed in the system 21. Three types of plug-ins 23, 24 hand 26 are connected to the setup infrastructure 20 which are used by the setup infrastructure 20 to coordinate the software install process as described below in more detail. The setup infrastructure 20 is also connected to a management directory 27 which is used to store data of a program package or program product during the install process and thereafter. The management directory 27 thus contains data of the program packages and individual program products which were previously installed and contains references to code portions of these program packages and individual program products as included in the program library of system 21.

The setup infrastructure 20 does not have specific knowledge on how to change and modify the system resources, nor does it know about program package formats, and it does not know in advance about program packages to install. The setup infrastructure 20 relies on the three types of plug-ins 23, 24 and 26 which provide the required information for the installation process.

System resources providing bind support plug-ins 23 are called SI-Supporter plug-ins or short SI-Supporters. Software packages that use the Setup Infrastructure to get installed are represented by plug-ins 24 called SI-exploiter plug-ins or short SI-exploiters. The SI-Exploiters contain a package description and product description, customization dialogs and instantiation support serving to modify these components. The plug-ins 23 and 24 represented in FIG. 2 as multiple blocks are in practice code portions which are stored in the system library of system 21 and accessed by the setup infrastructure 20 to perform the required services during the installation, customization and activation of software packages or products.

Figure 3:
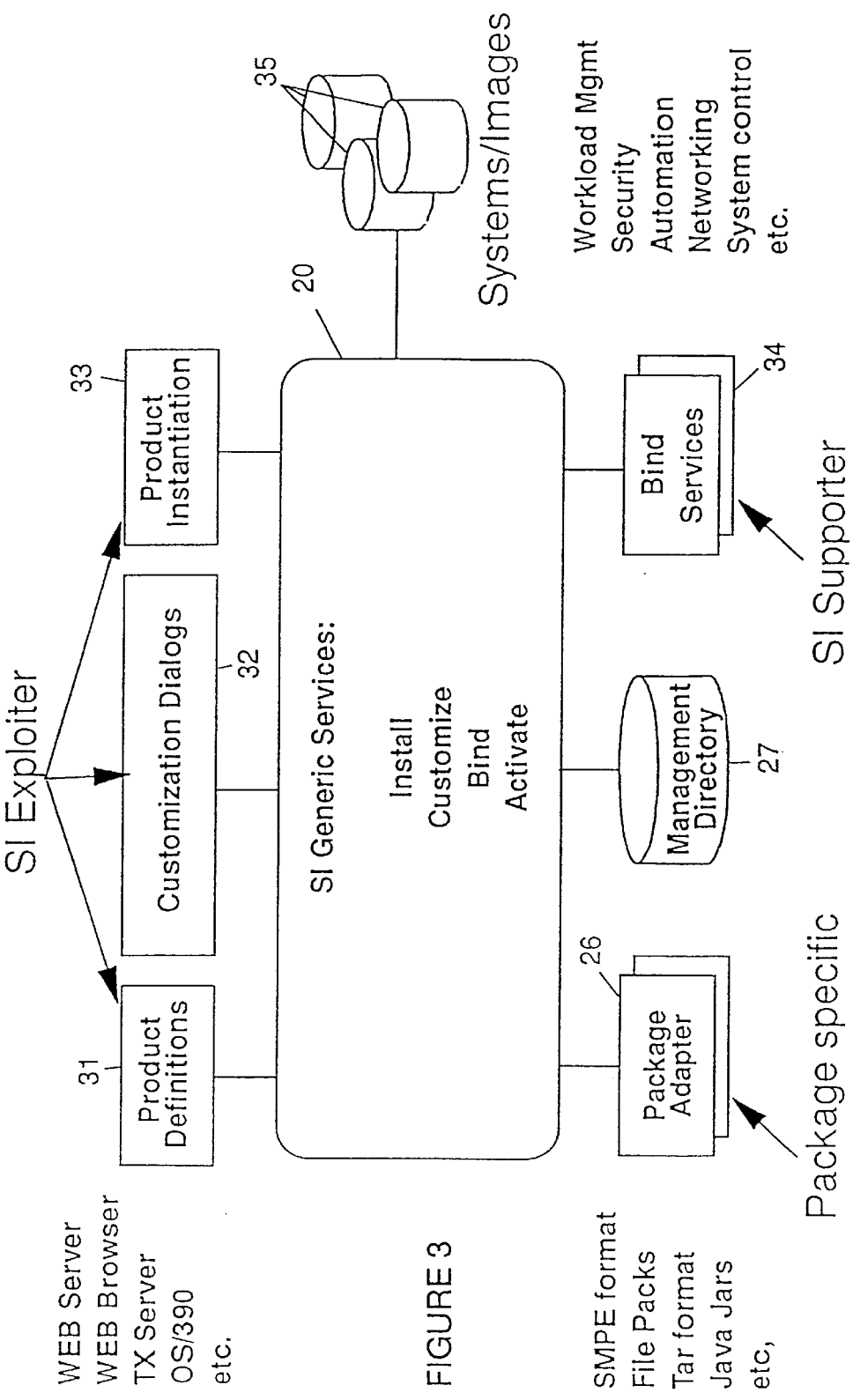
FIG. 3 a functional representation of the setup infrastructure as shown in FIG. 2.

FIG. 3 shows a more functional representation of the setup infrastructure 20 and the related components. The setup infrastructure 20 provides generic services including install, customize, bind and activate services. An SI-Exploiter belongs to a certain program product or a certain package of program products to be installed and includes the following parts:

Product Definitions 31 which are a series of statements used to describe a particular SI-Exploiter product;

Customization Dialog 32 which is represented by a dialog program used to request interactively the actual values of customization data, i.e. the customization properties;

Product Instantiation 33 which is a program used to modify the SI-Exploiter product according to the customization dialog properties.

In addition, SI-Supporters are shipped as part of an SI-Exploiter.

FIG. 3 indicates some product examples such as WEB server, WEB browser, Transaction (TX) server, OS/390 components etc. Accordingly, there exist SI-Exploiters of program products or packages of program products already installed in the system libraries 35 which are part of the system 1 of FIG. 2. The stored packages may include, for example, workload management programs, security packages, automation packages, networking packages, system control programs, etc. SI-Supporters 23 of the program products already installed as well as of program products to be installed support the bind phase of the install process.

Each SI-Supporters includes a Bind Support service program which provides bind services 34 that SI-Exploiters can use to get installed and registered properly. SI-Exploiters indicate to SI-Supporters via the customization dialog what they need by means of Bind-Requests. An SI-Exploiter can be an SI-Supporter as well. In this case the SI-Supporter services are available for other SI-Exploiters to use. SI-Supporters are SI-Exploiters as well, they play two roles: the SI-Supporter role for other SI-Exploiters and the SI-Exploiter role to get installed itself.

In general, there may exist many (i.e. hundreds) SI-Exploiters and much fewer (i.e. dozens) SI-Supporters. Examples of SI-Supporters are: system parameter support (PARMLIB), security packages (RACF), transaction monitors (CICS, IMS), data base administrators, workload management support (WLM), etc. These SI-Supporters help SI-Exploiters to setup the correct run-time environments.

Bind Requests are usually defined generically and are void of any specific supporter implementation detail. Because of this fact and because of the strict separation of exploitation and supporting roles, one can easily replace SI-Supporters with new software levels or equivalent competitive products without impacting SI-Exploiters. For example, considering bind support for directory services, an SI-Exploiter can define a new directory schema using the AddSchema bind request. For this example two different, mutually exclusive implementations of directory services are considered, one using a relational, the other a hierarchical database as backup store. Both will offer their own AddSchema bind support implementation, an exploiter will not notice the difference.

The software packages are described by using e.g. XML (Extended Markup Language) vocabulary itemizing the pieces it includes and defining requisite products it depends on.

Part of the product description are specifications of the customization dialogs and an indication whether it introduces SI-Supporter plug-ins as well.

A third type of plug-ins which are called Package Adapters plug-ins 26 or short Package Adapters (PA) define and understand specific package formats (FIGS. 2 and 3). There exists a PA for each data format which installable program products may have. Examples of such data formats are SMPE, File Packs, TAR, or Java Jars. The Package Adapters 26 will transform their private data model to the data model defined by setup infrastructure 20 and store this transformed data into the management directory 27. The setup infrastructure 20 includes a default Package Adapter which is used for the program load operation when the data format of the program to be installed is not yet known to the setup infrastructure 20.

3 The Management Directory

An important part of the system described is the management directory 27 which is the storage of data and references as used by the setup infrastructure 20 for performing the install process. The management directory 27 may be an X.500 based directory that is accessed by using the LDAP protocol. The Data Model used by directory 27 is a CIM compliant data model proposed by DMTF. This data model is defined as an hierarchical structure which enables grouping of related data. For instance, all data that is associated with a particular software package or product is defined as subordinate data.

4 Product Definitions

An example of product definitions is shown below:

Package: e-business suite ....
  Product: Web Server ....
    File: abc Name: ws1.file Size: 15 MB ....
    ....
    File: klm Name: wsX.file Size: 100 KB ....
    CustDialog: WSdialogs ....
    ProdInst: WS instantiation ....
    BindSupport: AddWebApp ...
    Properties: (default properties)
  Product: Web Browser
    File: uvw Name: wb1.file Size: 3 MB ....
    File: xyz Name: wb2.file Size: 10 KB ....
    CustDialog: WBdialogs ....
    ProdInst: WB instantiation ....
    Properties: (default properties)

The terms used in these Product Definitions have the following meanings:

| Term | Meaning |
| --- | --- |
| 'Package': | Identifying the beginning of a package containing one or more program products. |
| 'Product': | Identifying the beginning of product definitions in a 'Package'. |
| 'File': | A reference to a file that is part of a product. Multiple files can be part of a product. The actual file itself is somewhere else on the package media. |
| 'CustDialog': | Identifies the Customization Dialog program, it contains a reference to the file in which the actual program can be found. |
| 'ProdInst': | Identifies the product instantiation program, it contains a reference to the file in which the actual program can be found. |
| 'BindSupport': | Identifies that a product contains Bind support as well; it contains a reference to the file in which the actual program can be found. |
| 'Properties': | Customization data for a program. |

The product definition will be read during the install phase and placed into the management directory 27. During the remaining setup phases, the product definition will be augmented with additional data and additional entries will be added to the definitions in the management directory 27.

The hierarchy shown above is an example of two product definitions combined in one software package. Both products are SI-Exploiters, the first one is an SI-Supporter as well because it introduces bind support services which in this case serve the registration of new Web Server applications.

A part of the entries include references of attribute values stored in the system 21. For instance, a bind request for adding a dataset name to a search path should not have the dataset name as value but a reference to the entry and attribute that defines the actual dataset name. This bind request may have the following format:

BindReq: AddToSearchPath (dsn: &Product: Web Server-.Dataset: klm.Name).

In this case the actual value will be determined at bind time. The reason for this is to enable detection of users of values. In case the administrator has to change the actual dataset name, the setup infrastructure 20 can determine which other entries are depending on that value and, in such case, re-schedule the bind processing.

The Process

Figure 4:
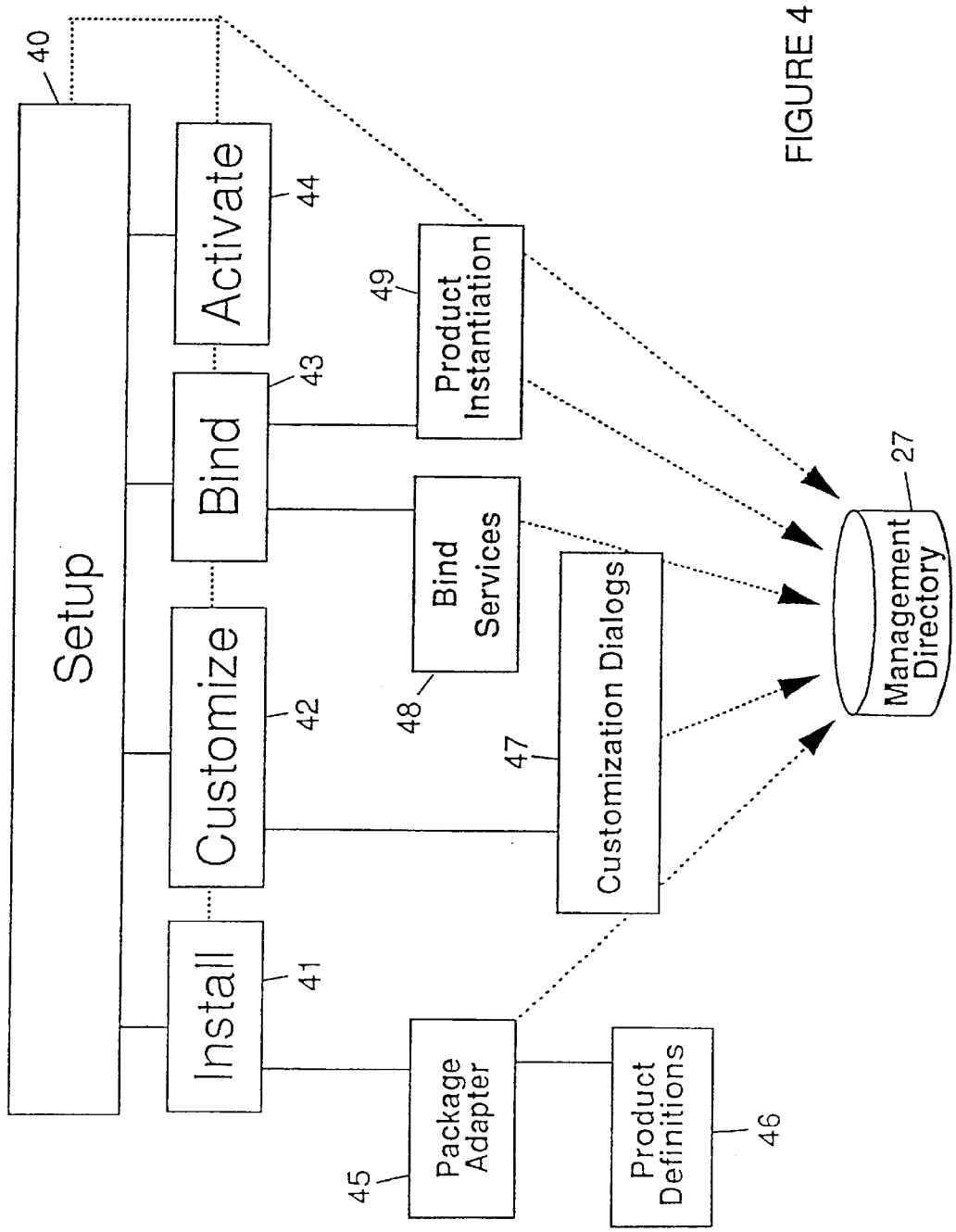
FIG. 4 a functional flow diagram of the setup process.

As shown in the functional flow diagram of FIG. 4 the setup process 40 is subdivided into the four major phases install 41, customize 42, bind 43 and activate 44 which are invoked separately. At any point in time the effects of one phase can be undone.

1 The Install phase

The install phase 41 selects the appropriate Package Adapter 45 which will process the product definitions 46 and place them in the management directory 27. At this point, the setup infrastructure 20 knows all about the program product which may be part of a program package, and it can use a standard dialog to determine where the libraries of the program product should be placed in the system 21. The standard dialog should also be able to determine that all *install* requisites are able to be satisfied and to drive the appropriate installation program. During this phase the setup infrastructure 20 will register where to find the customization dialogs and the product instantiation program and whether the program product introduces a new SI-Supporter 23.

Once the requisites have been verified and the install program has been invoked, the product definitions will be augmented with information about the status and where the libraries of the program product have been placed in the system 21. For the example cited above the following status is achieved considering only the Web Server product:

Product: Web Server ....
  Status: installed
    File: abc Name: ws1.file Size: 15 MB Volume: APPVOL
    ....
    ....
    File: klm Name: wsX.file Size: 100 KB Volume: APPVOL
    ....
  CustDialog: WSdialogs ....
  ProdInst: WS instantiation ....
  BindSupport: AddWebApp ....
  Properties: (default properties)

Herein 'Status' indicates the Setup status of a program product.

2 The Customize Phase

During the customize phase 42 the setup infrastructure 20 invokes the customization dialogs 47 of the selected products via the management directory 27 from the system 21. The dialogs are written using a specialized XML vocabulary. The dialogs will offer the administrator the possibility to modify default settings and will then generate appropriate bind requests which are placed in the management directory 27 as well.

Because of the use of the management directory 27 the amount of information required to be specified by the human administrator of the system has been reduced. For example, DB2 customization currently requires the data set name for Language Environment libraries. After the install phase is extending to the Language Environment, this information is available in the management directory 27 and does not need to be requested by the administrator. Other information, like an IP HOSTNAME, can now automatically be satisfied, thereby further reducing the input required during customization.

The product status will be updated, the modified properties and the Bind-Requests will be added. For the example cited above the following status is thus achieved:

Product: Web Server ....
  Status: customized
    File: abc Name: ws1.file Size: 15 MB Volume: APPVOL ....
    ....
    File: klm Name: wsX.file Size: 100 KB Volume: APPVOL ....
  CustDialog: WSdialogs ....
  ProdInst: WS instantiation ....
  BindSupport: AddWebApp ...
  Properties: (default and customization properties)
  BindReq: Security (add authorized program wbserv) open
  BindReq: DataBase (add table xyz, size 20M) open
  BindReq: ExecProperty (automatic restart) open Herein 'BindReq' means an entry, generated by the Customization Dialog program requesting specific bind support service.

3 The Bind Phase

As described before, binding is the process of tying a program package or product to an image. After the system administrator has indicated which image to bind to by setting up the appropriate bind requests, setup infrastructure 20 will examine these bind requests and invoke the corresponding bind service routines 48 in the management directory 27. The invoked bind service routines 48 will examine the bind requests and perform the requested functions.

The bind service routines 48 also know how to activate the requests. Depending on the changes requested, there will be situations where a new IPL of the image is needed or where the image must be instructed to use new configuration files without re-IPL.

The Bind phase 43 also calls a Product Instantiation program 49 which enables the program product to be installed to modify itself according to the customization properties.

Figure 5:
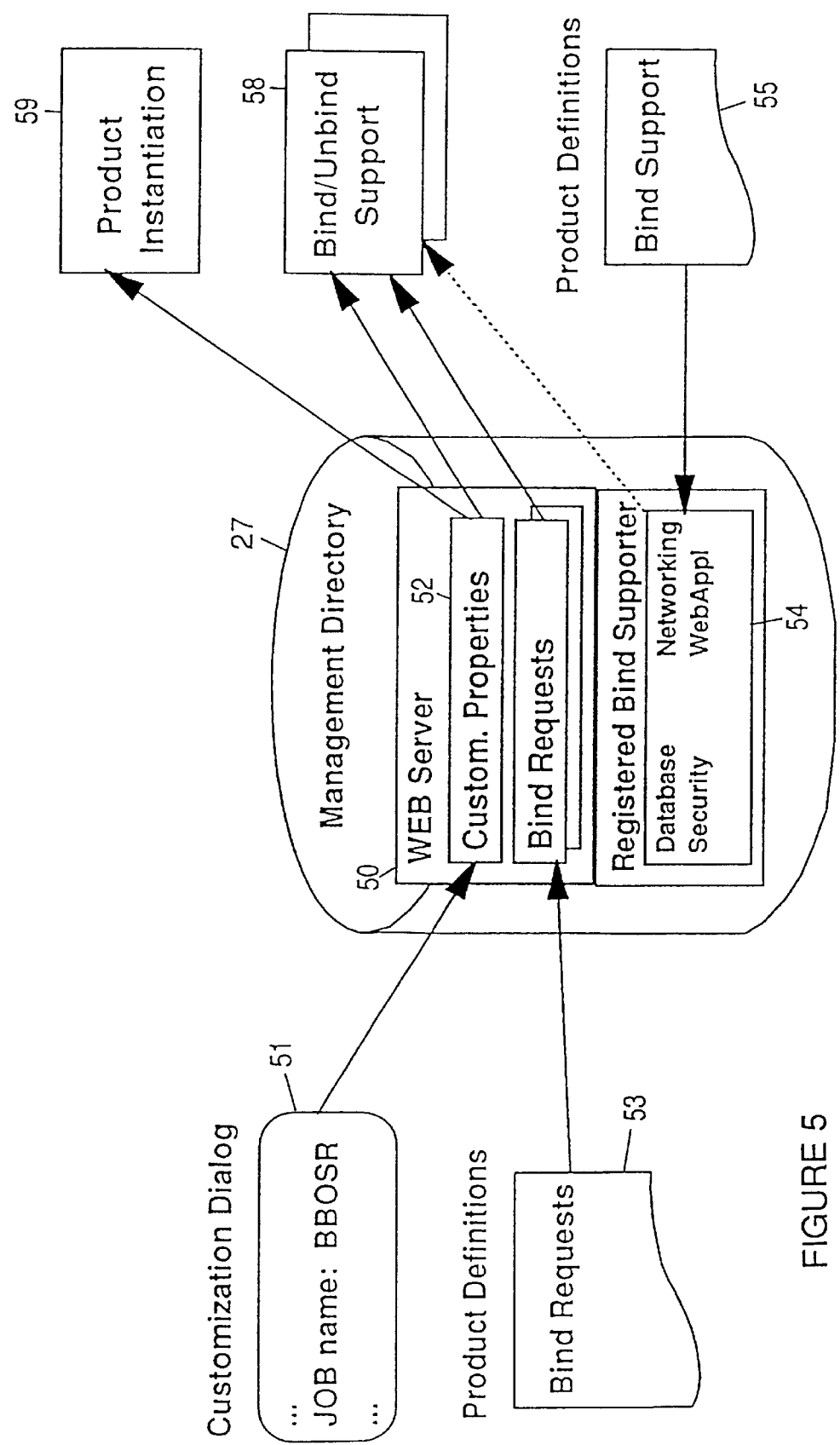
FIG. 5 a data flow diagram of the bind request processing in the process of FIG. 4.

FIG. 5 shows the data flow of the bind request processing in form of the transfer of data to and from the management directory 27. During the customization dialog 51 a Job name which, for example, may be BBOSR and belongs to a WEB Server 50, is registered into the management directory 27 among the customization properties 52 of the product. As part of registering the product definitions, corresponding the SI-Exploiters produce Bind-Requests which are also stored in the management directory 27. The Bind-Requests may refer to at least one SI supporter 54 which are invoked by the setup infrastructure 20 to be registered into the management directory 27. By means of the product definitions bind support 55 indicates that the product offers bind support for other program products. In the example shown, there are SI-Supporters registered in the directory 27 for database, security, networking and WEB application packages. These SI-Supporters are made available to the product instantiation 59 and to the bind/unbind services 58.

After successful processing of the bind requests the updated product definitions of the above example will look as follows:

Product: Web Server ....
  Status: bound
    File: abc Name: ws1.file Size: 15 MB Volume: APPVOL ....
    ....
    File: klm Name: wsX.file Size: 100 KB Volume: APPVOL ....
  CustDialog: WSdialogs ....
  ProdInst: WS instantiation ....
  BindSupport: AddWebApp ...
  Properties: (default and customization properties)
  BindReq: Security (add authorized program wbserv) done
  BindReq: DataBase (add table xyz, ... size: 20M) done
  BindReq: ExecProperty (automatic restart) done
  Activate: Command (Set SearchPath klm, ... ) open Herein 'Activate' means an entry, generated by the Bind support services for indicating specific actions needed to activate the program product being installed.

4 The Activation Phase

As the last step, the system administrator can ask setup infrastructure 20 to activate the WebServer of the above example. SI 20 will process the activate request as added to the management directory by the bind phase. The updated product definitions of the example will then look as follows:

Product: WebServer ....
  Status: activated
    File: abc Name: ws1.file Size: 15 MB Volume: APPVOL ....*....
    File: klm Name: wsX.file Size: 100 KB Volume: APPVOL ....
  CustDialog: WSdialogs ....
  ProdInst: WS instantiation ....

BindSupport: AddWebApp ...
Properties: (default and customization properties)
BindReq: Security (add authorized program wbserv) done
BindReq: DataBase (add table xyz, size 20M) done
BindReq: ExecProperty (automatic restart) done
Activate: Command (Set SearchPath klm,...) done Although the bind request and the activation request have been executed, all data associated with the product are kept in the management directory 27 and not removed.

Policies

An enterprise can use policies defining how bind requests are to be processed. It is possible to block particular bind requests until approval by a particular person. The approver can modify the bind request according to the enterprise rules. Examples are naming of entities or sizes of databases, execution privileges, etc. The approver can release the requests after modification or inspection. Bind processing will continue only when blocked requests are released by registered approvers.

Policy definitions are placed in the management directory 27 such as, for example:

Policies:
  BindProcesssing:
    Security: block Approver: (name)
    DataBase: block Approver: (name)
    ExecProperty: Inform: (name)

Support for Product Removal

Because all details about program products are kept in the management directory 27, removal of program products from the system 21 is fully supported. The phases described above, except customization, will be executed in reverse.

'Deactivate' will undo the activation phase.

'Unbind' will undo the bind phase. The Unbind process understands the removal context and will reverse all Bind Requests associated with the product, whereby 'use counts' of system resource settings will be observed.

'De-install' will undo the install phase, thereby cleaning up all remnants of the product.

Support for Reference Systems and Export Function

Since all data pertaining to products is kept in the management directory 27, the setup infrastructure 20 is able to export a completely customized program product or collections of program products. The setup infrastructure 20 will produce sets of files and the updated product description which contains all customization data. These sets of files can be shipped to other locations or systems. The export function will produce a software package that can be processed by the default package adapter 26. Today, customers use various techniques to deploy software packages throughout their enterprises. The export function of the system and method according to the invention provides a structured means for customers to:

'replicate' a product or system when building a copy for maintenance;

'replicate' a product or system for a secondary test or production image;

'replicate' a product or system to a remote site. This enables large enterprises to consolidate parts of their IT staff into a central location. In this location products will be installed, customized and tested. When tests have proven the quality to be acceptable, the product can be exported and subsequently imported at remote sites.

'promote' a test image to production. It also enables vendors to deliver products in new, more efficient packages.

During the export process it can be defined whether customization will be allowed or restricted at the receiving location.

While the invention is described with reference to a preferred embodiment of the invention, modifications of this embodiment or other implementations of the invention are within the scope of the invention as defined in the claims.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

What is claimed is:

1. A system for request based installation, customization and activation of computer program packages or products on a computer system operated by a system control program which provides support for the installation, customization and activation of computer program packages or products, said computer system having a plurality of system resources including a plurality of program packages and products stored in the system, where at least some of said program packages and products stored in the system have interdependencies among each other and where for a program packages or product to be installed, customized and activated interdependencies have to be established to at least some of the program packages and products stored in the system, the system comprising:

setup infrastructure means for coordinating the loading, customization, binding and activation of the program package or product to be installed customized and activated;

a plurality of first plug-in means each connected to one system resource of said plurality of system resources and used by the setup infrastructure means for creating a product definition, for providing customization dialogs and for support to initialize and modify said program package or product to be installed, customized and activated;

a plurality of second plug-in means each connected to selected ones of said plurality of system resources for providing bind services to the setup infrastructure means, said bind services are used by said first plug-in means to establish binding to at least some of the program packages and products store in the system, where binding parameters needed by the first plug-in means are indicated to the second plug-in means by bind requests to generically describe a state of at least one system resource of the plurality of system resources to facilitate successful installation, customization and activation of the program package or product to be installed, customized and activated, said bind requests to be interpreted by said bind services at bind time, and wherein said bind services establish said binding using implementation specific details of the at least some of the program packages and products stored in the system, without said implementation specific details being specic details being specified in said bind requests.

2. A system according to claim 1, comprising a plurality of plug-in means of a third type which identify various data formats, one of said third type plug-ins is assigned to the program package or product to be installed, customized and activated for indicating to the setup infrastructure means specific package formats as used by said program package or product to be installed, customized and activated.

3. A system according to claim 2, wherein the third type plug-in means comprises means for transforming a private data model of the program package or product to be installed, customized and activated to the data model defined by the setup infrastructure means.

4. A system according to claim 1, wherein at least one of the first plug-in means can simultaneously be a second plug-in means, where bind services provided by the second plug-in means are available to other first plug-in means.

5. A system according to claim 1, wherein second plug-in means serve simultaneously as first plug-in means, where the second plug-in means provide bind services to other first plug-in means and the first plug-in means serve to get installed itself.

6. A system according to claim 1, further comprising a management directory connected to the setup infrastructure means for storing all data associated with a particular software package or product and references to portions of said software package or product in a system library, said references are used by the setup infrastructure means for accessing data of a software package or product in a system library wherein said software package or product is stored.

7. A system according to claim 6, wherein the management directory comprises a data model which is defined as an hierarchical structure and which enables grouping of related data.

8. A system according to claim 6, comprising management policy definitions for defining how bind requests are to be processed, said policy definitions are stored in the management directory and are used by the setup infrastructure means to block or modify bind requests until approval has been given.

9. A system according to claim 1, wherein the plurality of second plug-in means for providing bind services further comprises providing bind services interpreting one bind request to establish binding to different implementations of the at least some of the program packages or products stored in the system.

10. A method for request based installation, customization and activation of computer program packages or products on a computer system operated by a system control program which provides support for the installation, customization and activation of computer program packages or products, said computer system having a plurality of system resources including a plurality of program packages and products stored in the system, where at least some of said program packages and products stored in the system have interdependencies among each other and where for a program package or product to be installed, customized and activated interdependencies have to be established to at least some of the program packages and products stored in the system, the method comprising:

(a) performing a coordinating operation for loading, customization, binding and activation of the program package or product to be installed, customized and activated;

(b) creating a product definition and providing customization dialogs and support to initialize and modify said program package or product to be installed, customized and activated;

(c) providing bind services by at least some system resources of the plurality of system resources to said coordinating operation to establish binding to at least some of the program packages and products stored in the system using implementation specific details of the at least some of the program packages and products stored in the system, without said implementation specific details being specified in bind requests interpreted by said bind services; and (d) creating bind requests for generically describing a state of at least one system resource of the plurality of system resources to facilitate successful installation, customization and activation of the program package or product to be installed, customized and activated, and specifying binding parameters used to select bind services to be provided by at least some system resources of the plurality of system resources, said bind requests to be interpreted by said bind services at bind time.

11. A method according to claim 10, comprising (e) identifying the data formats as used by said program package or product to be installed, customized and activated and indicating the identified data format to step (b).

12. A method according to claim 11, wherein step (e) comprises transforming a private data model of the program package or product to be installed, customized and activated to a data model as defined for the coordinating operation.

13. A method according to claim 10, further comprising (f) storing, in a management directory, all data associated with a particular software package or product and references to portions of said software package or product in a system library; and using said references for accessing said data in the system library.

14. A method according to claim 13, comprising defining the data model of the management directory as an hierarchical structure which enables grouping of related data.

15. A method according to claim 13, comprising defining policy rules for how bind requests are to be processed, storing said policy rules in the management directory and using said policy rules in the coordinating operation of step (a) to block or modify bind requests until approval has been given.

16. A method according to claim 10, comprising using the data and references stored in the management directory for removal of program products from the system.

17. A method according to claim 9, comprising using the data and references stored in the management directory for exporting completely customized program products or collections of program products to other locations.

18. A method according to claim 10, wherein providing bind services further comprises providing bind services interpreting one bind request to establish binding to different implementations of the at least some of the program packages or products stored in the system.

* * * * *

UNITED STATES PATENT AND TRADEMARK OFFICE
CERTIFICATE OF CORRECTION

PATENT NO. : 6,715,144 B2
DATED : March 30, 2004
INVENTOR(S) : Daynes et al.

It is certified that error appears in the above-identified patent and that said Letters Patent is hereby corrected as shown below:

Column 12,
Line 36, delete the word "packages" and insert -- package --

Column 13,
Line 3, delete the words "being specic details"

Column 14,
Line 53, delete the number "9" and insert -- 10 --

Signed and Sealed this

Thirteenth Day of July, 2004

JON W. DUDAS
*Acting Director of the United States Patent and Trademark Office*